Nov. 12, 1940.   R. W. BROWN   2,221,470
METHOD OF MAKING FLEXIBLE PRESSURE CONTAINERS
Filed April 18, 1936   6 Sheets-Sheet 1
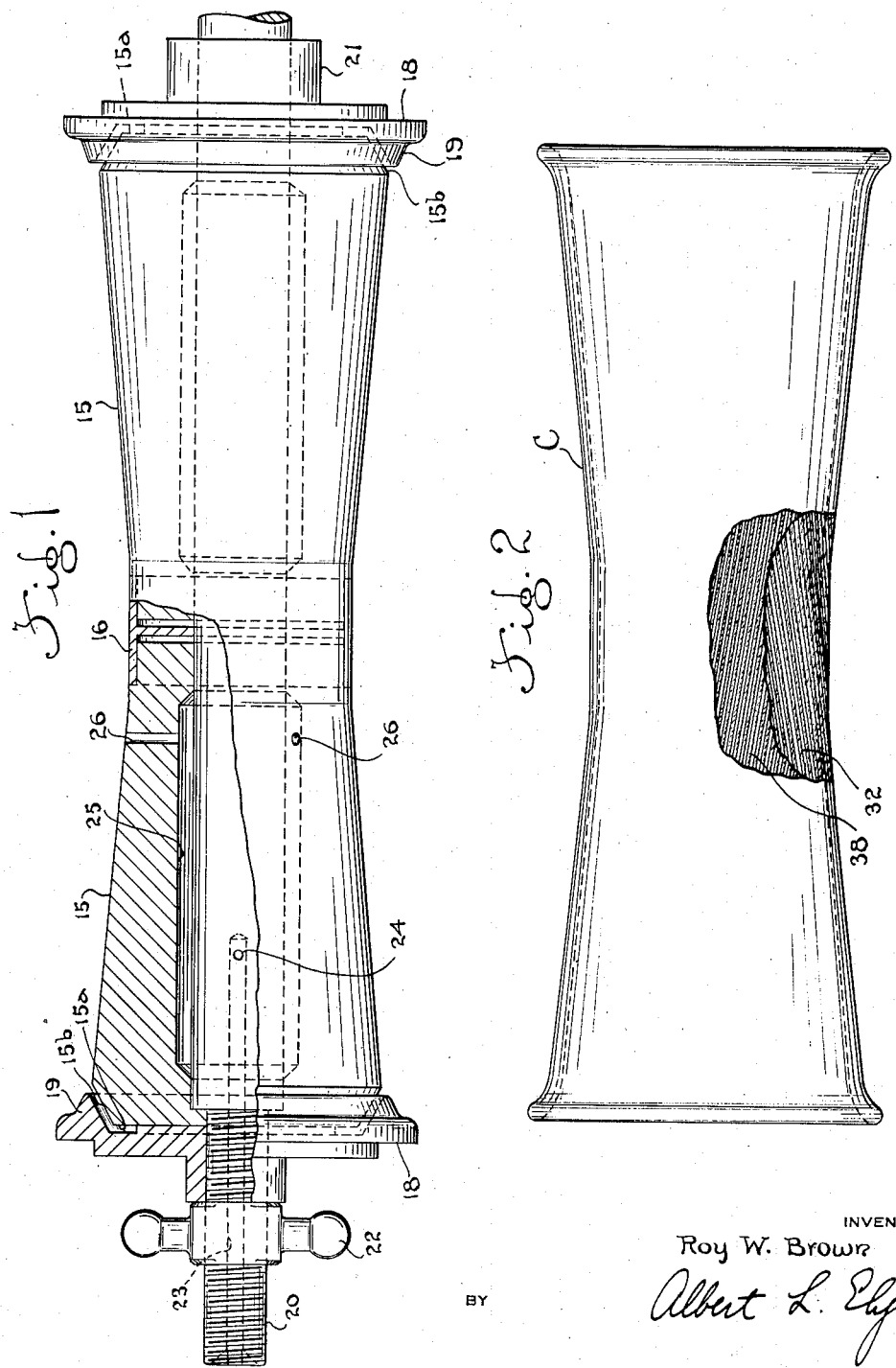
INVENTOR
Roy W. Brown
BY Albert L. Ely
ATTORNEY

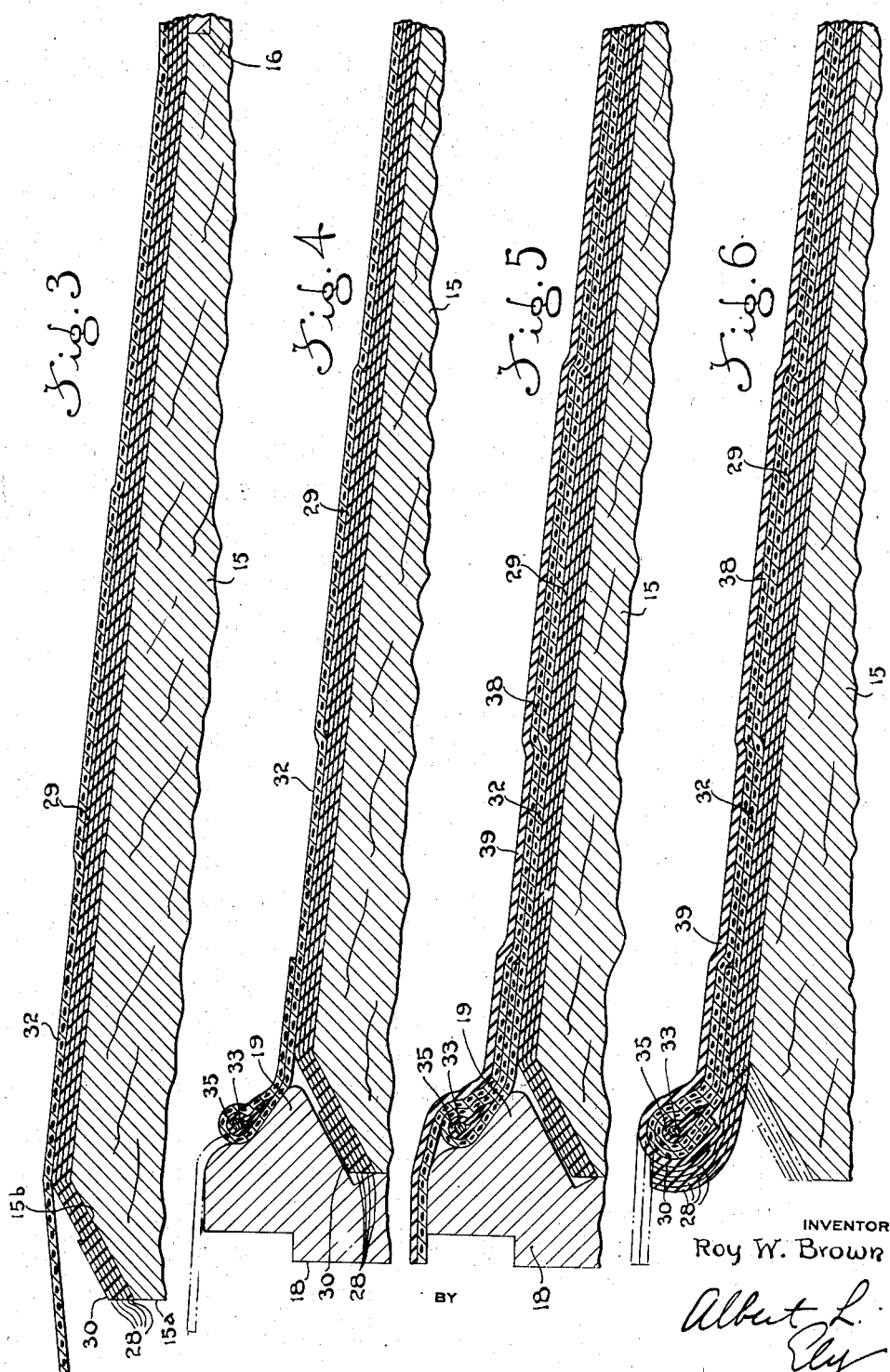

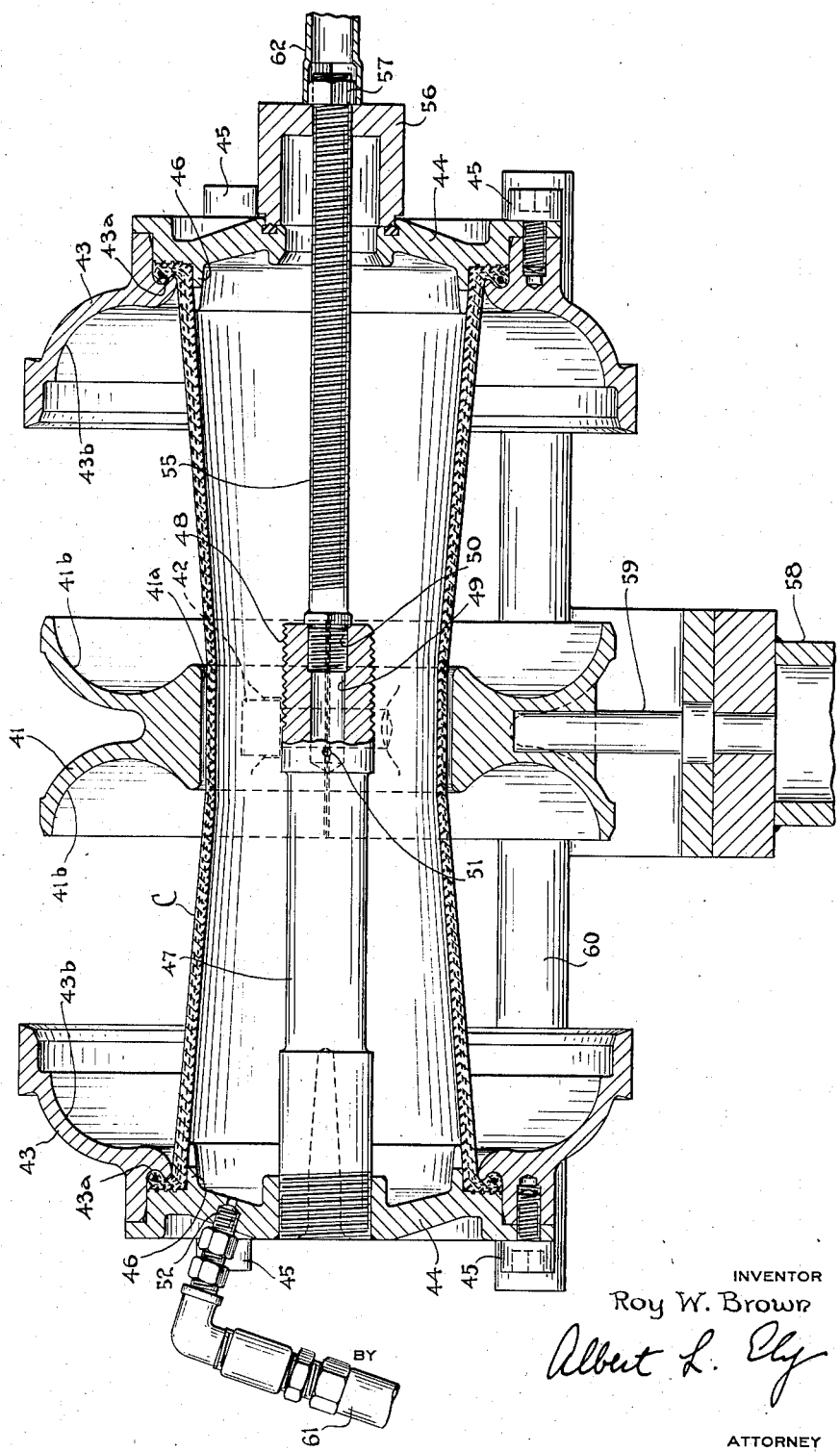

Nov. 12, 1940.   R. W. BROWN   2,221,470
METHOD OF MAKING FLEXIBLE PRESSURE CONTAINERS
Filed April 18, 1936    6 Sheets-Sheet 4

INVENTOR
Roy W. Brown
BY
ATTORNEY

INVENTOR
Roy W. Brown
BY
Albert L. Ely
ATTORNEY

Patented Nov. 12, 1940

2,221,470

UNITED STATES PATENT OFFICE 2,221,470

METHOD OF MAKING FLEXIBLE PRESSURE CONTAINERS

Roy W. Brown, Akron, Ohio, assignor to The Firestone Tire & Rubber Company, Akron, Ohio, a corporation of Ohio Application April 18, 1936, Serial No. 75,168

4 Claims. (Cl. 154—2)

This invention relates to flexible pressure containers, and to methods of making the same, and more especially its relates to flexible, pneumatically-operated, supporting devices such as may be used, for example, in place of metal springs for supporting the chassis of a motor vehicle upon the axles thereof, and to procedure for making them. Pneumatic supporting devices of the character mentioned may be advantageously employed in many installations where a piston and cylinder, metal Sylphon or diaphragm has heretofore been used.

The chief objects of the invention are to provide an improved bellows-shaped pressure container composed of vulcanized rubber with fabric and metal reinforcing therein and to provide improved procedure for the expeditious manufacture thereof. More specifically, the invention aims to provide improved procedure for assembling the rubber and fabric constituents of the container; to provide for incorporating inextensible metal rings in the respective end portions of the structure, which rings are of larger diameter than the said portions; to provide for distending the structure, in tubular form, to bellows shape; and to provide an improved method of vulcanizing the bellows-shaped container. Further objects are to shape a pulley band or drum-built article to torus form and to vulcanize same without the use of an expansible core, and with vulcanizing fluid directly in contact with the inner surface of the article. In its broader aspects the method of the invention may be employed in tire manufacture. Other objects will be manifest.

Of the accompanying drawings:

Figure 1 is a side elevation of a building form upon which the flexible container initially is constructed, parts being broken away and in section;

Figure 2 is a side elevation of a flexible container that has been built upon the form shown in Figure 1, after its removal therefrom;

Figure 3 is a fragmentary section, on a larger scale, of a building form, and a flexible container in the first phase of construction thereon;

Figure 8:
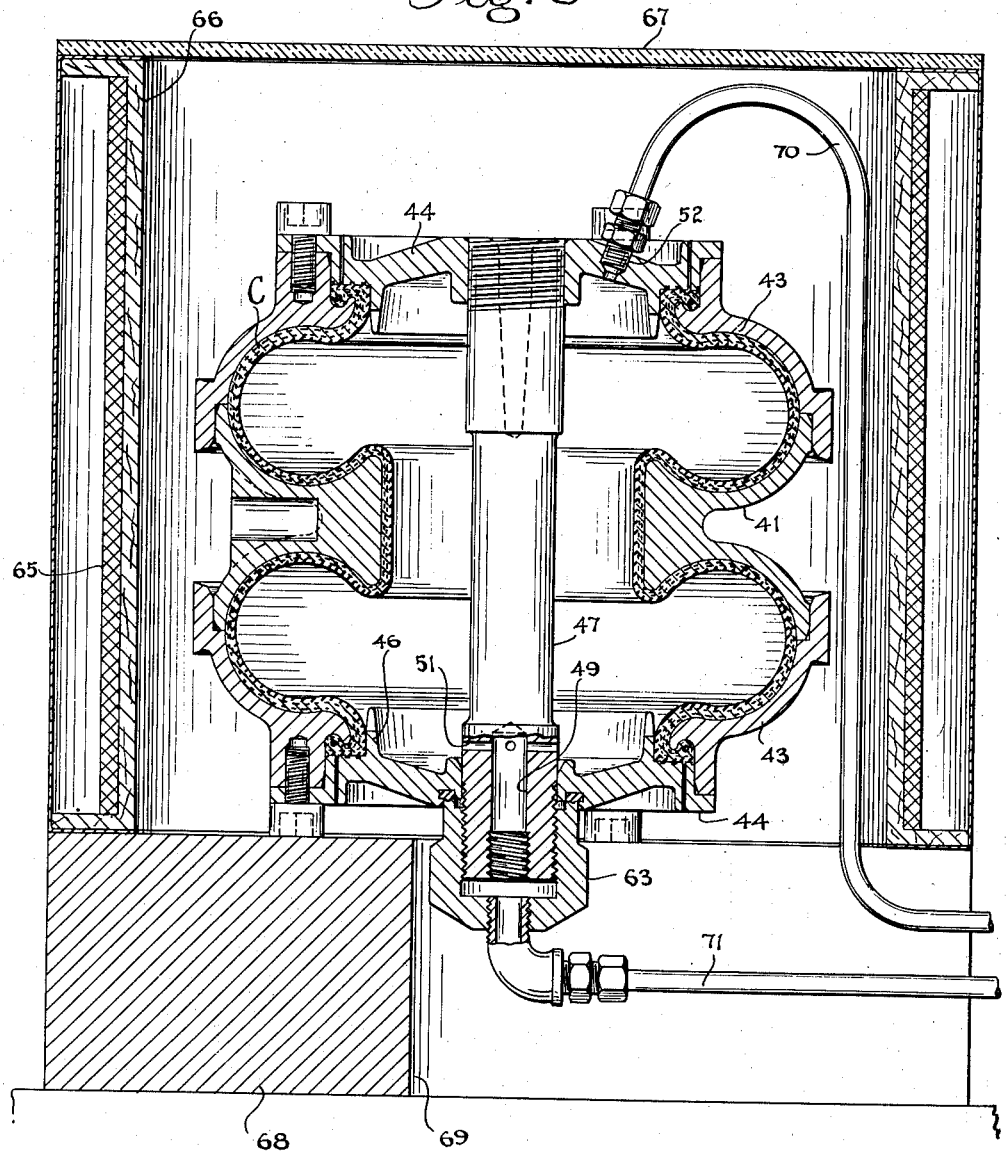
Figure 9:
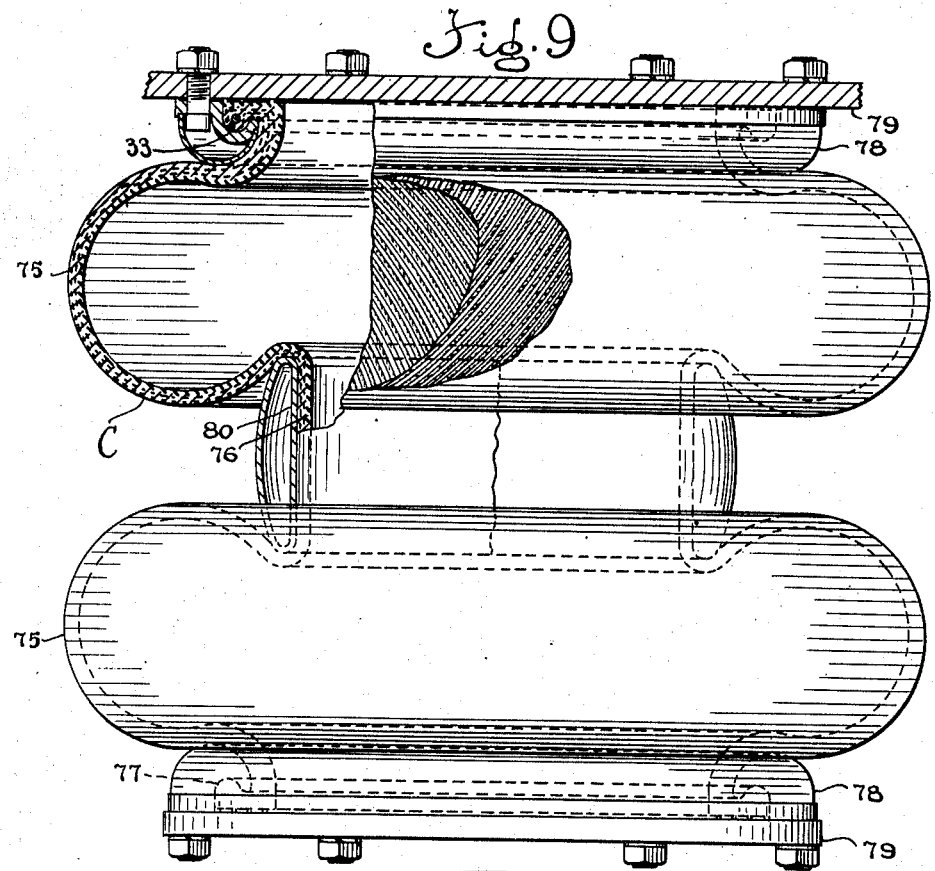
Figure 10:
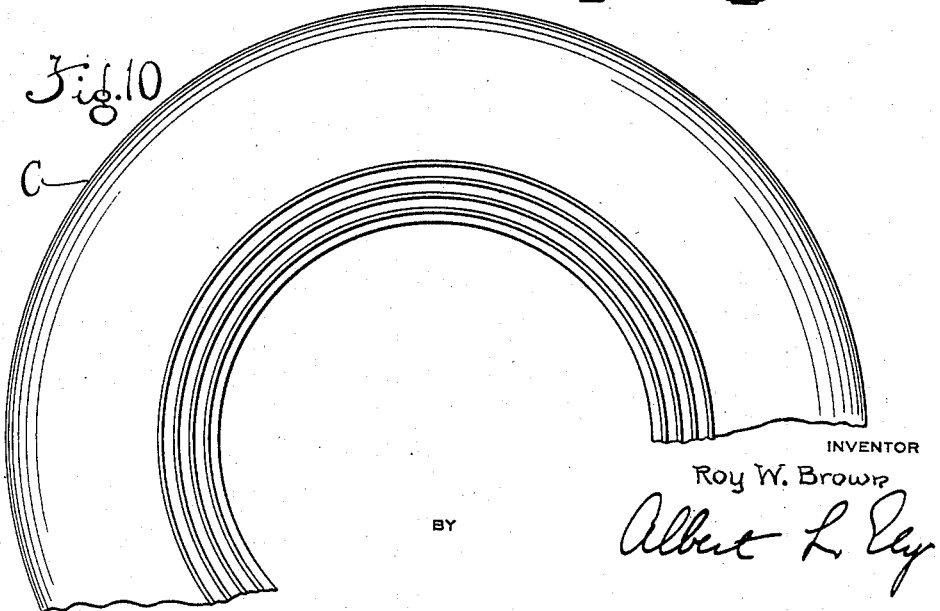
Figure 11:
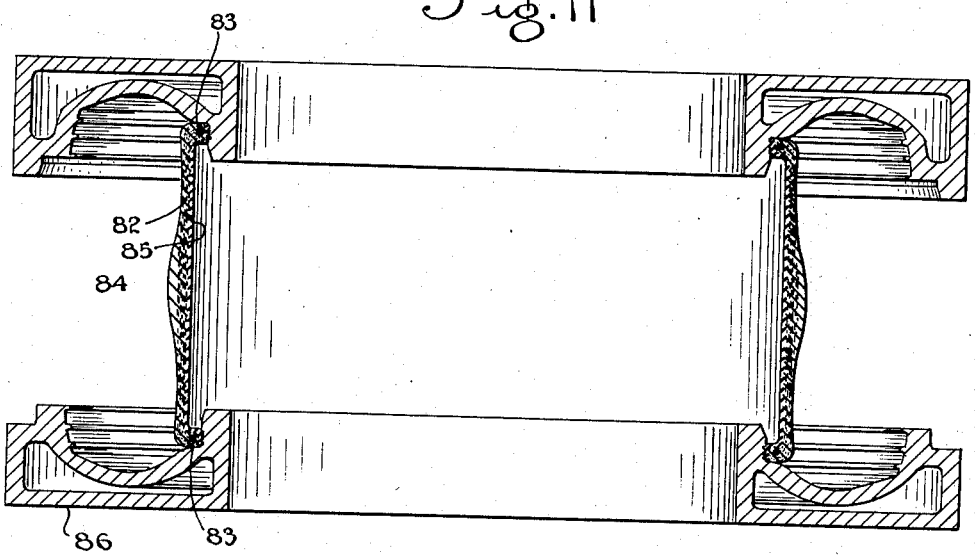
Figure 12:
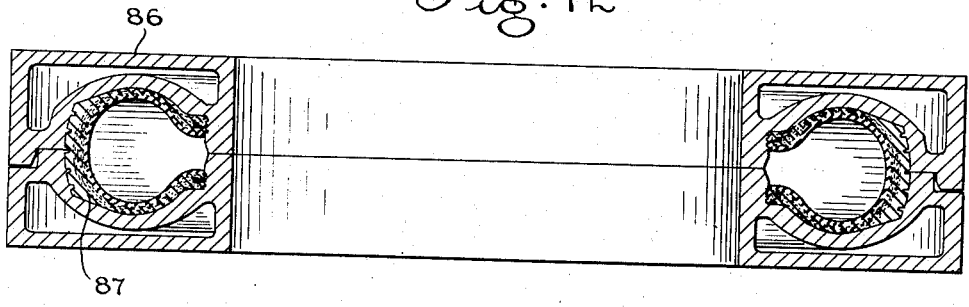

Figures 4, 5, and 6 are views similar to Figure 3 and illustrate successive subsequent phases of the construction of a container;

Figure 7 is a diametric section through a container structure such as that shown in Figure 2, and molding apparatus assembled with the container, as they appear prior to the distending of the container and the closing of the mold thereon;

Figure 8 is a diametric sectional view of the work, a closed mold within which it is confined during vulcanization, and an electrical vulcanizing apparatus in which the mold and work are received for effecting vulcanization of the latter;

Figure 9 is a side elevation of a finished container and metal fixtures adapted to be attached thereto, parts being broken away and in section;

Figure 10 is a fragmentary plan view of the pressure container illustrated in Figure 9;

Figure 11 is a diametric section of a tire pulley band and a tire mold, showing how assembly is effected before the pulley band is distended to tire shape; and Figure 12 is a diametric sectional view of a finished tire made from the pulley band illustrated in Figure 11, in accordance with the method of the invention, and a mold in which the tire is confined during vulcanization.

Referring now to Figure 1 of the drawings, there is shown a building form upon which the improved containers initially are fabricated. Said form comprises a pair of coaxial, wooden form-sections 15, 15 that are of general frusto-conical shape and have their small ends disposed adjacent each other, said small ends being telescoped within a cylindrical metal sleeve 16 that has its peripheral surface flush with the adjacent surface of said sections 15. Each section 15 has an end face 15a at its larger end, which end face is normal to the axis of the form, and each has a frusto-conical surface 15b that is reversely tapered with relation to the major taper of the form section, and joins the latter to the end face 15a.

Coaxially abutting each end face 15a of the form are respective removable metal cap-plates 18. Each of the latter is formed on the side thereof abutting the form section with a laterally projecting circumferential flange 19 that overlies the frusto-conical surface 15b of the form section, the inner peripheral surface of said flange being tapered parallel to the said surface 15b, and being somewhat spaced therefrom. The outer peripheral surface of the cap-flange 19 is sloped reversely of the inner periphery thereof and thus flares outwardly toward the base of the flange. The form sections 15 and cap-plates 18 are formed with axial apertures, and are keyed upon a spindle 20 between a collar 21 at one end thereof and a handwheel 22 threaded upon the other end thereof. The threaded end portion of the spindle 20 is formed with an axial bore 23, and a transverse bore 24 connects the inner end of bore 23 with the surface of the spindle, said bore 24 opening into a cavity or chamber 25 formed interiorly of the form section 15. Radial bores 26, 26 in the form section connect the cavity 25 with the outer face of the section. The end portion of spindle 20 that carries collar 21 is journaled in any suitable bearing structure (not shown), and is connected to suitable driving means (not shown) by means of which the form may be rotated.

In the fabricating of a container structure upon the building form, the cap-plates 18 are not utilized in the initial phase of the building operation. The building form, without said cap-plates, is rotated upon its axis, and the respective constituent plies of rubber and rubberized fabric are fed thereonto and rolled firmly into place. The sequence and identity of the several plies will best be apparent from reference to Figures 3 to 6. The first plies to be applied to the form are of unvulcanized rubber and four in number, said plies being designated 28, 28. The plies 28 are pressed firmly onto the drum, including the tapered surfaces 15b at each end thereof, the marginal portions of the plies extending beyond the end faces 15a of the drum. Said marginal portions of the plies are then trimmed flush with the surfaces 15a as shown, the latter serving as guides for the trimming operation. Next, two relatively narrow reinforcing plies 29 of unvulcanized rubber strip material are applied circumferentially to the drum, each of said plies being positioned about mid-way between the middle of the drum and an end-face 15b thereof. A narrow strip of unvulcanized rubber 30 also is applied to the top layer 28 at each lateral margin thereof.

The next ply to be added is of weftless or weak-wefted cord fabric that is rubber-coated on both sides. This ply, designated 32, is bias-cut, and is mounted on the form with its cords disposed at an angle of about 20 degrees to the axis of the form. The ply 32 is of such width that its lateral marginal portions extend substantially beyond the end-faces 15a of the form. The ends of the ply are joined on the form in a narrow lapped splice, and the latter is covered with a thin strip of unvulcanized rubber (not shown) according to the practise in manufacturing cord tires. The ply 32 is pressed firmly to the underlying plies in the region thereof intermediate the tapered regions 15b of the form, and is left unattached from the latter regions as is most clearly shown in Figure 3.

Next a pair of endless, inextensible wire beads, such as the bead 33, are placed upon the container structure by passing them axially over the free end of the latter. The bead rings 33 are made of heavy piano wire of suitable length, and are made endless by welding together the respective ends of the wire. The bead rings may be given a light coating of rubber, if desired, by dipping them in a viscous composition of rubber and volatile solvent. The loose marginal portions of the fabric ply 32 are then flared outwardly, after which the cap-plates 18 are mounted upon the spindle 20 and secured in place against the end-faces 15a of the form, the laterally extending flange 19 of each cap-plate extending beneath the adjacent marginal portion of ply 32.

The said marginal portions of the ply 32 are then pressed down against the outer peripheral surface of the cap-flanges 19, as indicated in broken lines in Figure 4, narrow strips of unvulcanized rubber 35 applied thereto in the regions thereof that are to receive the beads 33. The bead rings 33 are then placed against the respective gum strips 35, concentrically of the form, after which the marginal portions of ply 32 are removed from the outer periphery of the cap-plates 18 and are folded over the respective bead rings 33 so as to enclose the latter, the rubber strips 35 being disposed between the bead rings and the fabric. Inwardly of the bead rings the marginal portions of ply 32 are pressed against the underlying container structure, as shown.

Thereafter, a second rubber-coated ply of cord fabric 38 is applied to the structure on the form and adhered thereto, the marginal portions of said ply 38 extending onto the outer periphery of cap-plates 18, as shown in Figure 5. The ply 38 is substantially identical to ply 32 except that it is cut on the opposite bias, with the result that the cords thereof extend transversely of the cords of ply 32, as is shown in Figure 2.

Over fabric ply 38 is mounted a ply of unvulcanized sheet rubber 39. After the several plies of the container structure are rolled down firmly, the marginal portions of plies 38 and 39 are trimmed off flush with the outer end faces of the cap-plates 18, after which the latter are removed from the form.

The overhanging lateral portions of the ply 38, with rubber ply 39 adhered thereto, are then folded inwardly so as to enclose that portion of the container structure that includes the bead rings 33. Finally, those portions of the four plies 28 that lie upon tapered faces 15b of the form, and strips 30 thereon, are lifted from the form, and are distended outwardly and adhered to the adjacent, outwardly flared, bead portion of the container structure, as is clearly shown in Figure 6. This completes the fabrication of the container structure, the same hereinafter being designated C. The container structure C is loosened from the building form by fluid pressure that is admitted between the structure and form through the agency of the bores 23, 24, cavity 25 and bores 26 therein. The container structure is removed from the form by demounting the latter from the spindle 20, removing the form sections axially from the respective ends of the container, and finally withdrawing sleeve 16 from either end of the structure. The structure in its present form is ready to be mounted in a mold for the purpose of vulcanizing its rubber portions.

The mold in which the container structure C is vulcanized is best shown in Figures 7 and 8. Said mold comprises a two-piece, transversely divided, medial section 41, the respective parts of which are secured together by cap screws 42 so that it constitutes an annular structure. The structure 41 comprises a cylindrical molding surface 41a, and two annular, concentric, concave molding surfaces 41b, 41b that are disposed radially outwardly of molding surface 41a and have their inner perimeters joined to the respective ends of the said surface 41a. The mold also comprises a pair of annular sections 43, 43 disposed coaxially of mold section 41 and adapted to telescope over the outer periphery of the latter in the closed condition of the mold. Each mold section 43 includes an annular, concentric, concave molding surface 43b that is aligned with a molding surface 41b of mold section 41. The mold sections 43 include respective axially apertured closure plates 44, 44 that interfit the inner perimeters of sections 43 and are removably secured thereto by cap-screws 45, 45. Between them, each mold section 43 and its closure plate 44 defines a molding cavity 43a for the bead portion of the container structure C. At the inner periphery of each molding cavity 43a, the closure plate is formed with a circumferential flange 46 that is disposed upon the inner surface of the work for a purpose presently to be explained. One of the closure members 44 has a stem 47 permanently mounted in its axial aperture, said stem extending from the inner face of said member, toward the other member 44, and having its free end exteriorly threaded as shown at 48. The free end of stem 47 is formed with an axial bore 49 that is formed with female threads 50 at its outer end, and at its inner end a transverse bore 51 connects said bore 49 with the surface of the stem. The member 44 in which the stem 47 is mounted is formed with a threaded aperture 52 adapted to receive a pipe connection subsequently to be described.

In the operation of enclosing the container structure C within the mold, the respective halves of mold section 41 are assembled about the medial region of the container structure and clamped together by means of the screws 42, there being but slight clearance between the structure C and the molding surface 41a of the mold section. The mold sections 43 are then mounted upon the respective end portions of the structure C, which is accomplished by slightly deforming the bead portions of said structure and passing them through the axial opening of the mold section. The bead portions of the structure C are then positioned in the molding cavities 43a of the mold sections 43, and closely confined therein by mounting the closure plates 44 on the mold sections 43 and securing them in place by means of the cap-screws 45. A threaded extension 55 is then threaded into the bore 49 of stem 47, said extension projecting through the axial aperture of the opposite closure plate 44. A cap-shaped adapter 56 is mounted upon the free end portion of the extension 55, between the said closure plate and a nut 57 threaded onto said extension. The various mold parts are maintained in axial alignment by mounting them upon a suitable support comprising a standard 58 having an upwardly projecting stud 59 upon which mold section 41 is swiveled, and carrying a pair of parallel horizontal bars, such as the bar 60, which support the mold sections 43, 43 and permit axial movement thereof. A conductor pipe 61 connected with a suitable source of air under pressure (not shown) is threaded into the aperture 52 of one of the closure plates 44.

The container structure C is then distended to bellows shape by slowly admitting air to the interior thereof, under 5 to 7 pounds pressure, and concurrently moving the mold sections axially, toward each other, to confine the distended work-structure therein. The axial moving of the mold sections is accomplished by threading the nut 57 along the extension 55 by means of a suitable tool, such as the socket wrench 62. As soon as the mold is fully closed and the work therein fully distended, the air hose 61 is disconnected so as to relieve the pressure within the mold. The extension 55 and adapter 56 are then removed, and the mold retained in assembled condition by means of a cap-nut 63, Figure 8, that is mounted upon the threaded end 48 of stem 47, said end of the stem projecting through closure plate 44 in the closed condition of the mold. The work is then ready to be vulcanized, which vulcanization is effected by means of heat and internal fluid pressure. Vulcanization may be carried out in a pot heater using steam as the mold-heating medium, or the mold may be electrically heated. The latter method is described herein, apparatus for effecting vulcanization being shown in Figure 8.

The vulcanizing apparatus comprises an electric coil 65 wound upon a tubular, wooden form 66 that has a cover 67, and has a base 68 that is suitably slotted at 69 to permit necessary piping to pass therethrough. Suitable electrical controls (not shown) are provided for controlling the electrical current in the coil 65. The mold is mounted in the vulcanizer on a vertical axis, and an exhaust pipe 70 is threaded into the aperture 52, the latter being disposed at the top of the mold. A fluid pressure conductor 71 is threaded into an axial aperture formed in the cap-nut 63, at the bottom of the mold. Both pipes 70 and 71 extend through the slot 69 in the vulcanizer to the exterior thereof, where the pipe 70 is provided with a suitable shut-off valve (not shown) and the pipe 71 is connected to a three-way valve (not shown) through which air, hot water, or cold water may be admitted to said pipe and to the interior of the work in the mold.

To vulcanize the structure C, after the mold is mounted in the vulcanizer, the pipe 70 is closed and air under pressure admitted to the pipe 71, which air passes through cap-nut 63, through bores 49 and 51 in stem 47 and thence to the interior of the work. Air pressure within the mold is built up to about 80 pounds for the purpose of forcing the work into conformity with the molding cavity of the mold. Next, pipe 70 is opened and air in the mold is replaced by cold water admitted through pipe 71. As soon as the air is completely evacuated from the work, pipe 70 is closed and the hydraulic pressure is built up to 200 pounds per square inch. With the work in the condition described, the coil 65 is energized, with the result that eddy currents are set up in the metal mold to heat the same to vulcanizing temperature. This condition is maintained for about 15 minutes. Then the pipe 70 is opened and hot water at 290° F. is circulated through the work for the remainder of the vulcanizing period, which is about 30 minutes. The flange 46 on the closure plate 44 prevents the incoming hot water from impinging directly against the inner surface of the work and thus overcuring the same. After vulcanization the water is drained from the interior of the work, the mold is opened, and the finished work removed, the latter then presenting the appearance shown in Figures 9 and 10. This completes the cycle of operations.

The feature of maintaining cold water in the mold during the initial phase of vulcanization assures that vulcanization will progress from the outer surface of the work toward the inner surface thereof, with the result that the rubber about the strands of cord plies 32, 38 will be "set up" or partly vulcanized beyond the soft stage before the inner rubber plies are softened by the admission of hot water to the interior of the mold. Thus the taut reinforcing cords of the work structure are prevented from retracting during vulcanization and pulling through the inner rubber layers, with the result that the finished structure is fluid tight.

The laminating of inner plies 28 insures that the rubber lining of the container will be impervious or fluid-tight by avoiding the pin holes or porosity which occurs in a single sheet of rubber during the calendering operation. Thus the inner lining cannot be permeated by the air or water used during the shaping and vulcanizing of the container. If permeation were permitted it would cause separation of the ply structure and pocketing of air or water therein. Likewise the laminated structure insures that the final product will be an air-tight container.

As illustrated in Figure 9, the flexible pressure container comprises a pair of annular axially aligned toroidal bellows formations 75, the respective cross-sections of which extend substantially in an arc of a circle in excess of a half circle, the adjacent inner portion of said formations being joined by a central substantially tubular wall 76. The latter is of relatively large diameter such that the flow of fluid between the bellows portions is substantially unretarded. The remote marginal sides of the bellows formations are formed with respective openings defined by marginal flanges 77, 77, which flanges are adapted to be connected by suitable attaching structures, such as the annular clamping rings 78, 78, to end plates 79, 79. A girdle ring 80 may be mounted about the central, tubular wall 76 to support same. To insure maximum amplitude of axial flexure and stability with minimum cord flexure the container is preferably proportioned so that said flanged marginal openings have a diameter substantially one-half the major diameter of the bellows, and said tubular portion has a diameter substantially three-eighths the major diameter of the bellows portion and a length substantially one-fourth the normal overall length of the container.

The procedure of manufacture is likewise applicable to the manufacture of drum built tires. Figure 11 illustrates a tire pulley band manufactured in accordance with the usual drum building practice. The band comprises the usual rubberized cord fabric body 82 having marginal bead portions 83 and a tread portion 84. The interior of the pulley band is provided with a layer or skim coat of impervious rubber compound 85, which layer may be laminated similar to layers 28 of Figure 3 to insure an impervious structure as described above. The pulley band is shaped by forcing same into a tire mold 86 by following the same procedure as employed in shaping the container described above—namely, by expanding the pulley band into the mold by means of fluid pressure and thereafter filling the cavity of the tire with cold water under sufficient pressure to hold the tire in contact with the mold cavity, while the outside of the tire is subjected to vulcanizing temperature. The tire cords are thus molded into proper toroidal form and set before the inner coating of impervious rubber becomes softened by the elevated temperature. Thereafter the cold water in the tire cavity is replaced by water at the vulcanizing temperature and pressure to complete the tire 87 as illustrated in Figure 12.

The invention makes possible economical manufacture of distended, reinforced, hollow rubber articles without the use of an internal fluid container, and it achieves the other advantages set out in the foregoing statement of objects.

Modification may be resorted to without departing from the spirit of the invention or the scope of the appended claims.

What is claimed is:

1. The method of making a flexible fluid container having a plurality of axially spaced enlarged portions and an intermediate portion of reduced cross section, which method comprises assembling a plurality of vulcanizable rubber plies which are to be later directly subjected to a heating fluid during shaping and vulcanizing into an open-ended generally tubular structure, assembling a rubberized fabric ply over said rubber plies, placing inextensible bead rings upon the partly built structure, separating the ends of the rubber plies from the ends of said rubberized fabric ply, flaring the margins of said latter ply outwardly, placing the bead rings upon the outwardly flared margins of said rubberized fabric ply and folding said marginal portions around the bead rings, assembling a further rubberized fabric ply upon said structure and over said beads, folding the marginal portions of the plies overlying the beads around the beads, uniting the rubber plies to said marginal portions, positioning a mold section having a restricted portion of substantially the same inside diameter as the outside diameter of said fabricated open-ended structure about an intermediate region of said structure, sealing the ends of said structure against mold sections complemental to said intermediate mold section to form an enlarged cavity on either side of said intermediate region, simultaneously subjecting the inside of said structure to fluid pressure while moving said ends toward each other to cause local distension of said structure against the inner surfaces of the walls of said mold cavities and then vulcanizing said structure in the mold by heating the mold while maintaining cold fluid under pressure within said structure for a determinate time interval and thereafter replacing the cold fluid with hot fluid for the remainder of the vulcanizing period.

2. The method of making a flexible fluid container having a plurality of axially spaced enlarged portions and an intermediate portion of reduced cross section, which method comprises assembling a plurality of vulcanizable rubber plies which are to be later directly subjected to a heating fluid during shaping and vulcanizing into an open-ended generally tubular structure, assembling a rubberized fabric ply over said rubber plies, placing inextensible bead rings upon the partly built structure, separating the ends of the rubber plies from the ends of said rubberized fabric ply, flaring the margins of said latter ply outwardly, placing the bead rings upon the outwardly flared margins of said rubberized fabric ply and folding said marginal portions around the bead rings, assembling a further rubberized fabric ply upon said structure and over said beads, folding the marginal portions of the plies overlying the beads around the beads, uniting the rubber plies to said marginal portions, positioning a mold section having a restricted portion of substantially the same inside diameter as the outside diameter of said fabricated open-ended structure about an intermediate region of said structure, sealing the ends of said structure against mold sections complemental to said intermediate mold section to form an enlarged cavity on either side of said intermediate region, simultaneously subjecting the inside of said structure to fluid pressure while moving said ends toward each other to cause local distension of said structure against the inner surfaces of the walls of said cavities.

3. The method of making a multi-ply flexible pressure container, which method comprises assembling a plurality of vulcanizable rubber plies which are to be later directly subjected to a heating fluid during shaping and vulcanizing into an open-ended generally tubular structure, assembling a rubberized fabric ply over said rubber plies, placing inextensible bead rings upon the partly built structure, separating the ends of the rubber plies from the ends of said rubberized fabric ply, flaring the margins of said latter ply outwardly, placing the bead rings upon the outwardly flared margins of said rubberized fabric ply and folding said marginal portions around the bead rings, assembling a further rubberized fabric ply upon said structure and over said beads, folding the marginal portions of the plies overlying the beads around the beads, and uniting the rubber plies to said marginal portions.

4. The method of making a multi-ply flexible pressure container, which method comprises assembling a plurality of rubber plies which are to be later directly subjected to a heating fluid during shaping and vulcanizing into an open-ended generally tubular structure, assembling a rubberized fabric ply over said rubber plies, placing inextensible bead rings upon the partly built structure, separating the ends of the rubber plies from the ends of said rubberized fabric ply, flaring the margins of said latter ply outwardly, placing the bead rings upon the outwardly flared margins of said rubberized fabric ply and folding said marginal portions around the bead rings, assembling a further rubberized fabric ply upon said structure and over said beads, folding the marginal portions of the plies overlying the beads around the beads, uniting the rubber plies to said marginal portions, and simultaneously subjecting the inside of said container to fluid pressure and moving said ends toward each other to cause local distension of said fabricated structure.

ROY W. BROWN.